(12) United States Patent
Potter et al.

(10) Patent No.: US 9,855,887 B1
(45) Date of Patent: Jan. 2, 2018

(54) DYNAMIC CONTROL OF PROJECTED LIGHT RELATIVE TO A SCENE

(71) Applicants: Daniel E. Potter, San Jose, CA (US); Matthew E. Last, San Jose, CA (US); Randol W. Aikin, San Francisco, CA (US); Christy F. Cull, Sunnyvale, CA (US); Malcolm J. Northcott, Felton, CA (US)

(72) Inventors: Daniel E. Potter, San Jose, CA (US); Matthew E. Last, San Jose, CA (US); Randol W. Aikin, San Francisco, CA (US); Christy F. Cull, Sunnyvale, CA (US); Malcolm J. Northcott, Felton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/221,417

(22) Filed: Jul. 27, 2016

Related U.S. Application Data

(60) Provisional application No. 62/198,047, filed on Jul. 28, 2015, provisional application No. 62/198,048, filed on Jul. 28, 2015, provisional application No. 62/198,053, filed on Jul. 28, 2015.

(51) Int. Cl.
| | |
|---|---|
| *B60Q 1/02* | (2006.01) |
| *B60Q 1/08* | (2006.01) |
| *F21S 8/10* | (2006.01) |
| *B60Q 1/14* | (2006.01) |

(52) U.S. Cl.
CPC .......... *B60Q 1/143* (2013.01); *F21S 48/1154* (2013.01); *F21S 48/1159* (2013.01); *F21S 48/1731* (2013.01); *B60Q 2300/114* (2013.01); *B60Q 2300/12* (2013.01); *B60Q 2300/13* (2013.01)

(58) Field of Classification Search
CPC .......................... B60Q 1/085; B60Q 2300/30; B60Q 2300/40; B60Q 2300/47; F21S 48/115; F21S 48/1131
See application file for complete search history.

(56) References Cited

U.S. PATENT DOCUMENTS

| | | |
|---|---|---|
| 4,805,038 A | 2/1989 | Seligson |
| 5,829,870 A | 11/1998 | Remillard et al. |
| 6,144,158 A | 11/2000 | Beam |

(Continued)

*Primary Examiner* — Joseph L Williams
(74) *Attorney, Agent, or Firm* — Polsinelli PC (57) ABSTRACT

A system for optically stabilizing the projection light from a vehicle. The system includes a light source for generating and emitting light, an aperture, and a spatial light modulator for altering an illumination pattern of the light. The spatial light modulator disposed along an optical path extending from the light source to the aperture, wherein the light projects from the aperture. The system also includes an inertial-sensing. The inertial-sensing unit generates signals representing a position of the vehicle, an orientation of the vehicle, or both. The system further includes a control unit. The control unit receives signals from the inertial-sensing unit to determine changes in position and/or orientation of the vehicle relative to the road and sends signals to the spatial light modulator adjust an illumination pattern of the light to steer the light to a nominal value, defined by a vehicle in a level plane relative to a road system.

20 Claims, 5 Drawing Sheets

(56) References Cited

U.S. PATENT DOCUMENTS

| | | | |
|---|---|---|---|
| 8,538,636 B2 | 9/2013 | Breed | |
| 9,116,344 B2 | 8/2015 | Wu et al. | |
| 9,150,146 B2 * | 10/2015 | Bae | B60Q 1/143 |
| 9,341,338 B2 * | 5/2016 | Ishizaki | B60Q 1/143 |
| 9,459,349 B2 * | 10/2016 | Miller | G01S 15/08 |
| 9,566,898 B2 * | 2/2017 | Langkabel | F21S 48/1131 |
| 2008/0106653 A1 | 5/2008 | Harris | |
| 2008/0198372 A1 | 8/2008 | Pan | |
| 2015/0042224 A1 | 2/2015 | Stout | |
| 2017/0074985 A1 | 3/2017 | Christmas | |

* cited by examiner

DYNAMIC CONTROL OF PROJECTED LIGHT RELATIVE TO A SCENE

CROSS-REFERENCE TO RELATED APPLICATIONS

This application claims the benefit of U.S. Provisional Application Ser. No. 62/198,048, filed Jul. 28, 2015, and entitled "COMMON APERTURE ILLUMINATOR AND IMAGING UNIT FOR AN ADAPTIVE LIGHTING SYSTEM," U.S. Provisional Application Ser. No. 62/198,053, filed Jul. 28, 2015, and entitled "ADAPTIVE LIGHTING SYSTEM WITH AN LCOS FOR MODIFICATION OF LIGHT DISTRIBUTION," and U.S. Provisional Application Ser. No. 62/198,047, filed Jul. 28, 2015, and entitled "OPTICAL STABILIZATION OF PROJECTED LIGHT RELATIVE TO A SCENE," the contents of which are each incorporated by reference in their entirety.

FIELD

This disclosure relates generally to dynamic control of a projected light relative to a scene. In particular, the disclosure relates to both optical stabilization of the projected light and/or modification of the light distribution of the projected light from a light source based on a measured position and/or orientation change of a vehicle.

BACKGROUND

In the auto industry, there is a movement towards developing adaptive headlights. Generally, adaptive lighting systems use feedback from imaging systems or other sensors to control the brightness and distribution of the projected light from a light source. Some adaptive headlights are designed to dim or brighten individually controllable regions. In use, adaptive headlights attempt to account for conditions of a vehicle and avoid illuminating unwanted locations in front of the vehicle. For example, when a vehicle goes over a bump in the road, the projected light from the headlight of the vehicle may jolt vertically, causing bright flashes projected to an oncoming vehicle or pedestrians. Adaptive headlights attempt to account for this vertical jolting of the light by adjusting the position of a projected beam down when the bump is detected. Further, the unstable illumination due to normal vehicle movements from bumps, potholes, and the like can complicate signal extraction in real-time computer vision systems using structured light.

Many conventional adaptive headlights have limitations that lessen the effectiveness of the system. For example, high resolution illumination of a scene is typically limited, as most adaptive lighting systems are attenuation based. Further, these systems also are limited as to the intrinsic brightness that can be projected and can also be limited in the depth of field for a projected image, such as when the in-focus image is limited to a plane. More importantly, adaptive headlight systems typically are not able to respond to changing conditions of the vehicle fast enough to account for rapid movements of the vehicle.

Thus, there is a need for a spatial light modulator in a high speed imaged-based feedback system which can modify the light distribution and/or update a scene illumination pattern faster than the inertial changes experienced during an instability event, and with sufficient stroke to take out the orientation and position errors encountered, among other needs and advantages.

SUMMARY

The disclosure describes devices, systems and methods for dynamically controlling a projected light relative to a scene.

In some aspects, an adaptive lighting system for controlling a projected light distribution includes an illumination unit and an imaging unit. The projected light distribution from the illumination unit can be modified in response to signals from the imaging unit. The illumination unit includes a coherent light source for generating a light, an aperture for projecting the light onto a scene; and a spatial light modulator disposed in an optical pathway between the coherent light source and the aperture, where the spatial light modulator is an LCoS array. The imaging unit includes a camera unit for capturing images of the scene. The system also includes a control unit in communication with the imaging unit and the spatial light modulator to control the spatial light modulator to alert the projected light distribution.

In other aspects, embodiments of the disclosure involve a feedback system from inertial sensing systems, such as an accelerometer or gyroscopic system, which can sense axis position and orientation changes, and/or a high frame rate imaging system for optical stabilization of the projected light. This information from the inertial sensing system and/or imaging system can be relayed in real time, at a rate much faster than the suspension error rise time, to a light projection system which can use a spatial light modulator to optically steer the headlight illumination to a nominal value defined by the vehicle in a level plane relative to the road surface, or to another definition of a nominal position and orientation. In some embodiments, the spatial light modulator can be a DMD, liquid crystal based (e.g. LCoS), or fast tip-tilt mirror system. In operation, the position and orientation errors in the suspension can be corrected faster than they are occurring in the control loop, thereby preventing a driver and passengers from perceiving an illumination change. In some embodiments, the orientation and position errors can occur inside the control bandwidth, which can allow for prevention of oncoming drivers from seeing high luminous intensity regions of the headlight system.

In some embodiments, a system for dynamically controlling illumination of a scene can include an illumination unit having an axis of projection and coupled to a vehicle. The illumination unit can include a light source for generating a light, an aperture, and a spatial light modulator for altering a pattern of the light. The spatial light modulator can be disposed along an optical path extending from the light source to the aperture, wherein the light exits the aperture along the axis of projection. The system can also include an inertial-sensing unit coupled to the vehicle. The inertial-sensing unit can generate signals representing a position of the vehicle, an orientation of the vehicle, a change in position of the vehicle, a change in orientation of the vehicle, or any combination thereof. Further, the system can include a control unit in communication with the illumination unit and the inertial-sensing unit. The control unit can receive signals from the inertial-sensing unit and adjust an orientation for the axis of projection, an illumination pattern for the light, or combinations thereof of the illumination unit.

BRIEF DESCRIPTION OF THE DRAWINGS

Although the following figures and description illustrate specific embodiments and examples, the skilled artisan will appreciate that various changes and modifications may be made without departing from the spirit and scope of the disclosure.

DETAILED DESCRIPTION

In one aspect, the disclosure is directed to devices, systems and methods for optical stabilization of a projected light relative to a scene. Embodiments of the disclosure involve a feedback system from an inertial sensor or other type of sensor which can determine axis position and orientation changes of a vehicle. The feedback information can be relayed in real time to a control unit of an illumination system to cause a spatial light modulator to adjust the projected light to a nominal position or orientation relative to the scene. The control loop of the system allows for adjusting the projected light to the nominal position at a rate generally faster than mechanical vibration compensation systems can adjust due to inertial changes by changing an illumination pattern of the light.

In another aspect, the disclosure is directed to systems, methods, devices, and the like, for controlling the projection of light in response to information provided by one or more sensors. In some embodiments, the systems, methods, devices, may be utilized to modify the projection of light. For example, the projected light may be directed to highlight select areas within the field of illumination. By controlling the contrast across the field of illumination, portions of the field of illumination may be highlighted or have more light projected onto them than other portions in the field of illumination. The portions of the field of illumination with a higher contrast or with more light projected onto them may be determined from information received about the field of illumination of the light from one or more sensors and/or imaging units.

In embodiments of the disclosure, the devices, systems and methods can be used to optically stabilize the projected light. In other embodiments of the disclosure, the devices, systems and methods can be used to control or modify the projected light distribution. In yet other embodiments of the disclosure, the devices, systems and methods can be used to both modify the projected light distribution as well as optically stabilize the projected light.

Figure 1A:
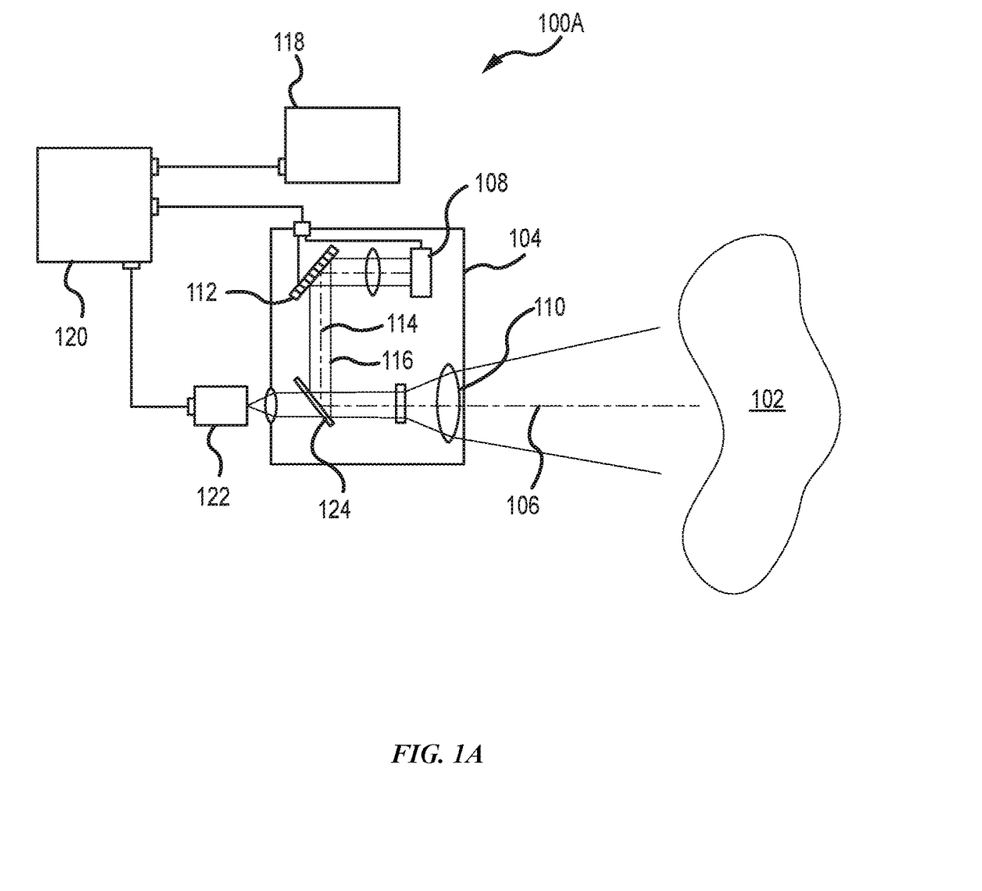
FIG. 1A is a schematic view of a system for dynamically controlling illumination of a scene, according to an illustrative embodiment.

Referring first to FIG. 1A, a schematic view is depicted of a system 100A for dynamically controlling illumination, including optical stabilization, of a scene 102, according to an illustrative embodiment. The scene 102 may be an environment outside of a vehicle and contain objects such as roads, sidewalks, intersections, crosswalks, signs, light-posts, overhanging lights, other vehicles, pedestrians, animals, trees, flora, and the like. In general, the scene 102 may include any number and types of objects to be illuminated by the lighting system 100A.

The system 100A generally includes an illumination unit 104 for generating a light 116 and projecting it along an axis of projection 106. The illumination unit 104 is coupled to any part of a vehicle from which illumination is desired, such as a headlight or taillight of the vehicle. Further, the vehicle can be any type of vehicle, such as a car, truck, motorcycle, boat or any other vehicle platform. For example, the illumination unit 104 may be mounted behind the front grill or from fascia and oriented to illuminate the road or other scene in front of the vehicle. Hence, the illumination unit 104 is operable to project light onto the scene 102 along the axis of projection 106.

The illumination unit 104 includes a light source 108 and an aperture 110 from which the light 116 can be projected. The aperture 110 faces the scene 102 so light can be projected through the aperture onto the scene. In some embodiments, the illumination unit 104 can provide visible light. In other embodiments the illumination unit 104 can optionally provide non-visible light. For example, in some embodiments, the illumination unit 104 can generate non-visible light, such as infrared (IR), ultra-violet (UV), etc., that can be used as an illumination source for advance driver assistance systems (ADAS) or other autonomy sensors.

The light source 108 may be a single source having a broadband emission (i.e., multiple wavelengths) across the electromagnetic spectrum (e.g., a halogen lamp) or a collection of multiple sources (e.g., an LED array). The collection of multiple sources may have individual elements dedicated to a specific band of emission or wavelength. For example, and without limitation, the collection of multiple sources may be an LED array having individual elements dedicated to red emissions, green emissions, and blue emissions (i.e., RGB). Other configurations for the collection of multiple sources are possible. In some embodiments, the aperture 110 may simply be an opening or transparent portion in the illumination unit 104 from which the light can be projected through. While in other embodiments, the aperture can contain optional optical elements to assist in directing light along the axis of projection 106. Non-limiting examples of optical elements include shutters, lenses, prisms, mirrors, filters, collimators, light pipes, beam splitters, and diffraction gratings. Other optical elements, however, are possible. In FIG. 1A, the aperture 110 is depicted as including a lens. However, this depiction is for purposes of illustration only. Those skilled in the art will recognize that other optical elements, and their corresponding combinations, are possible yet remain within the scope of the present disclosure.

In some embodiments, the aperture 110 includes a displaceable optical element selected from the group consisting of a lens, a mirror, and a prism. In such embodiments, a motion of the displaceable element includes a vertical shift, a horizontal shift, a tilt (i.e., rotation about a horizontal axis), a swing (i.e., rotation about a vertical axis), or combinations thereof. For example, and without limitation, the aperture could include a shift lens, a tilt/tip mirror, and a rotatable prism. Other displaceable elements are possible. The displaceable optical element is operable to assist in changing a direction, or orientation, of the axis of projection.

The illumination unit 104 also includes a spatial light modulator 112 disposed along an optical path 114 extending from the light source 108 to the aperture 110. The spatial light modulator 112 can alter an illumination pattern of a light 116 generated by the light source 108. Thereafter, the light 116 exits the aperture 110 along the axis of projection 106. The optical path 114 may incorporate optional optical elements therein, including optical subassemblies, to assist in controlling a propagation of light. FIG. 1A depicts the optical path 114 as having two lenses, which can focus the light and assist in directing along the optical path to the axis of projection 106. However, this depiction is for purposes of illustration only and any number of lenses or other optical elements may be used to control propagation of the light along the optical path.

It will be appreciated that the illumination pattern, after alteration, propagates along the optical path 114 and exits the aperture 110 along the axis of projection 106. The altered illumination pattern is thus projected onto the scene 102, which can be at a scale greater than that produced by the spatial light modulator 112. The spatial light modulator 112 may be any type of a digital micromirror device (DMD) or a liquid crystal on silicon (LCoS) device. A DMD, generally, is a chip or other surface with any number of reflective surfaces (such as microscopic mirrors) arranged in a rectangular array that can be individually controlled by signals provided to the DMD. Similarly, an LCoS device includes many miniaturized reflective surfaces arranged in a matrix that are individually controlled by voltages provided to each mirror. In general, the spatial light modulator 112 can manipulate spatial properties of the light 116. The manipulation of the spatial properties of the light can include altering the intensity of the light, a phase of the light, or combinations thereof in order to produce an altered illumination pattern. Specific embodiments for altering the intensity distribution will be discussed in more detail below in reference to FIG. 3.

The system 100A also includes a first inertia-sensing unit 118 coupled to some portion of the vehicle. In one embodiment, the inertia-sensing unit 118 is coupled to the illumination system 100A. In other embodiments, the inertia-sensing unit 118 is coupled to the chassis of the vehicle. Regardless of the location, the inertial-sensing unit 118 is operable to generate signals representing a change in axis position of the vehicle, a change in orientation of the vehicle, or any combination thereof. The change in axis position may be in the x-axis direction, y-axis direction, z-axis direction, or combinations thereof. In one particular embodiment, the inertia-sensing unit 118 may include one or more accelerometers and/or gyroscopes for sensing, respectively, translations and rotations of the vehicle. For example, and without limitation, the inertia sensing unit 118 may include three accelerometers and three gyroscopes for determining, respectively, translations and rotations of the vehicle in three dimensional space. Other sensor types and combinations, however, are possible. For example, a sensor may detect a movement of a steering wheel of the vehicle to determine when the vehicle is turned by the driver and translate that movement into a change is position of the vehicle.

The system 100A additionally includes a control unit 120 in communication with the illumination unit 104 and the inertial-sensing unit 118. The control unit 120 receives signals from the inertial-sensing unit 118, and in response, sends control signals to the illumination unit 104 to adjust the orientation for the axis of projection 106, an illumination pattern of the light 116, or combinations thereof. Thus, the control unit 120 is operable to change the illumination profile projected onto the scene 102 in cooperation with the spatial light modulator 112, the light source 108, and in certain embodiments, the aperture 110 in response to information or data received from the inertia-sensing unit 118. In general, such change occurs dynamically and in real-time based on feedback from at least the inertia-sensing unit 118. In embodiments where the aperture 110 includes the displaceable optical element, the control unit 120 may be in communication with a transducer (e.g., a motor) that enables actuation of the displaceable optical element.

In some embodiments, the system 100 includes an imaging unit 122 in communication with the control unit 120. In such embodiments, the systems can use feedback from imaging units along with the inertial sensors to control the distribution of the projected light from the illumination unit. The imaging unit 122 can include a camera in communication with an image processor. The imaging unit 122 can cover a wide range of the electromagnetic (EM) spectrum, from UV to shortwave infrared (SWIR) depending on the application. The imaging unit 122 can capture images of the scene 102, which can include interaction of the illumination profile projected from the illumination unit 104 with the scene 102 to determine the effect of the illumination on the scene and adjust the illumination in response.

As depicted in FIG. 1A, the imaging unit 122 shares the aperture 110 (i.e. a common aperture) with the illumination unit 104. To create optical path 114 with a shared common aperture for the illumination unit 104 and the imaging unit 122, additional optical elements can be disposed along the in the optical path 114 at any location between the aperture and imaging unit 122 to direct a portion of the light 116 to the imaging unit 122. Any number of optional optical elements can be placed in the optical pathway. One example of an optical element is depicted in FIG. 1A using a beam splitter 124 that directs a portion of reflected light from the scene 102 and received through the aperture 110 towards the imaging unit 122. A variety of types of beam splitters can be used. The beam splitter 124 can be wavelength dependent, polarizing, non-polarizing, dichroic, or any other suitable type of beam splitter. By placing the imaging unit in an orientation with an aperture that is shared with the illumination unit, and optically aligned thereto, a parallax effect of the system can be eliminated or otherwise reduced.

With an optical design that optically aligns the imaging unit 122 and light 116 of the illumination unit 104, the full field of illumination of a scene can be simultaneously imaged and illuminated through the common aperture. The simultaneous imaging and illumination of a scene through a common aperture allows for accurate mapping of the image to the illumination distribution (i.e. mapping of the projected light from the illumination unit 104) to the imaging unit 122 without an additional calibration system because the viewpoint for the imaging unit and the illumination unit is the same. This can reduce the parallax effect because the imaging unit 104 and the illumination unit 122 do not perceive the scene and/or objects in the scene from different distances, as in other systems where the imaging unit is located along a different view plane from the illumination unit. As a result of the accurate mapping, the system can be used for high spatial resolution applications.

However, other configurations of the imaging unit 122 are possible. For example, and without limitation, the imaging unit 122 may be a unit external to the illumination unit 104. Although FIG. 1A depicts the imaging unit 122 as being a single unit, this depiction is not intended as limiting. For example, in other embodiments, two or more cameras can be used in the imaging unit 122. In some embodiments, any number of cameras can be used, having different configurations, formats and/or wavelength sensitivities. In embodiments with two or more cameras, each camera can be fed by a separate beam splitter. By way of example, without intending to be limiting, a near infra-red (Near IR) camera can be fed with a dichroic beam splitter while a 50/50 beam splitter can be used to feed a second camera in the visible spectrum. In some embodiments, the imaging unit 122 can include cameras and image processors as separate components. Other numbers and configurations of the imaging unit 122 are within the scope of the disclosure.

The imaging unit 122 is operable to generate data signals representing the images of the scene 102 and send such data signals to the control unit 120. Thus, the imaging unit 122 effectively transmits the images to the control unit 120. In embodiments having the imaging unit 122, the control unit 120 can further receive data signals from the imaging unit 122 and use such data signals in combination with signals from the inertial-sensing unit 118 to generate control signals. In these embodiments, the control unit 120 may include processors and memories to process software algorithms that analyze the images captured by the imaging unit 122. Such software algorithms may identify characteristics of the scene 102 that merit altering the axis of projection 106 or the illumination pattern. Non-limiting examples of the characteristics include curves in a road, upcoming crests in a hill, animals entering a field of view, and highly-reflective objects, while other characteristics are possible. In some embodiments, the control unit 120 can also be operable to change the illumination profile projected onto the scene 102 in cooperation with the illumination unit 104. Such changes can occur dynamically and be real-time based.

In operation, the system 100A can be used for dynamically controlling illumination of the scene 102. The illumination unit 104 projects the illumination pattern onto the scene using a light generated by the light source 108. As the vehicle moves, the inertial sensing unit can measure vehicle parameters such as a position of the vehicle, an orientation of the vehicle, a change in position of the vehicle, a change in orientation of the vehicle, or combinations thereof. The inertial sensing unit sends signals to the control unit 120 to relay the measured vehicle parameters. In response, the control unit 120 can cause the illumination profile to change by altering an orientation of the axis of projection, the illumination pattern of the light, or a combination thereof, based on the measured vehicle parameters. In general, the orientation of the axis of projection is altered by displacing the illumination unit 104 or the light source 108, and/or an optical element associated with the illumination unit, such as the spatial light modulator that interacts with the light 116. The dynamic controlling of the illumination of the scene 102 is described in more detail below with reference to FIG. 4.

Although FIG. 1A illustrates system 100A with one illumination unit 104 and one imaging unit 122, any number of illumination units and any number of imaging units can be used in the systems along with any number of along with any number of optical elements to configure an optical pathway. In some embodiments, the illumination units and imaging units can be selected based on wavelengths. In other embodiments, the illumination units and imaging units can be selected and arranged based on polarization.

Figure 1B:
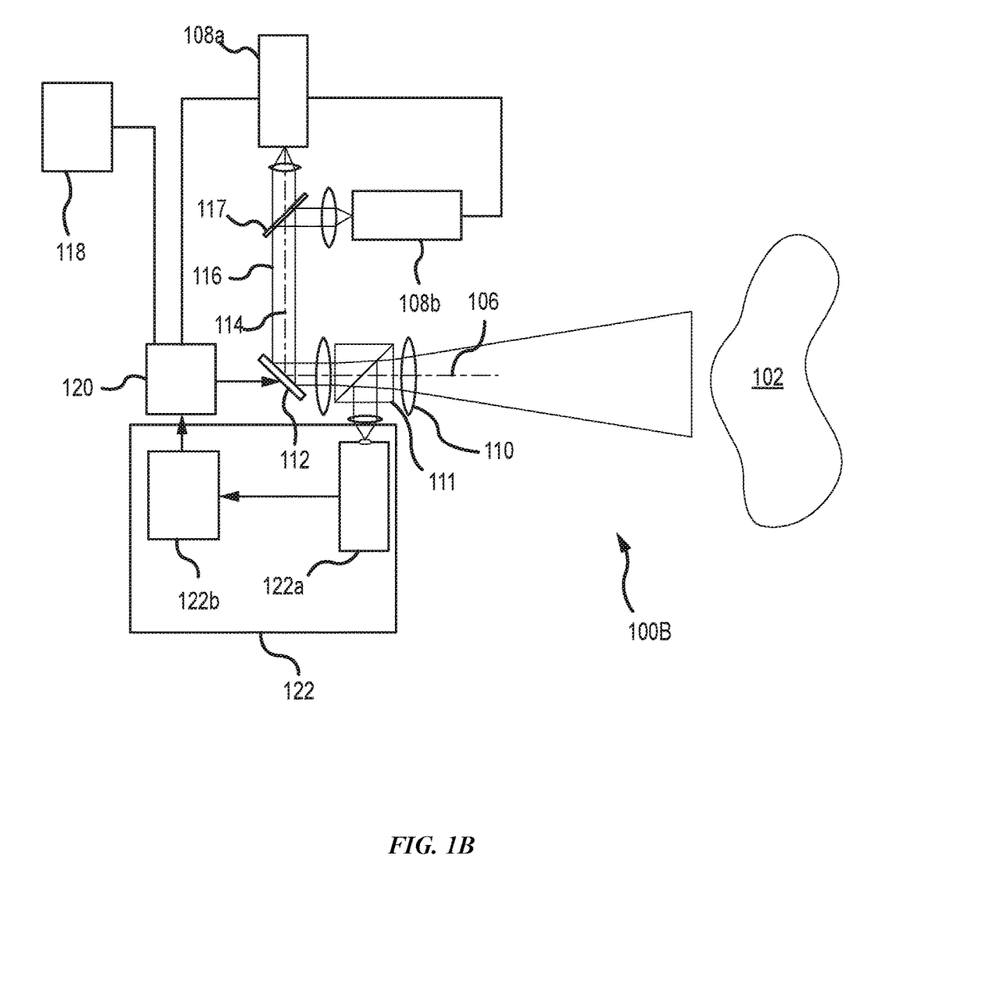
FIG. 1B is a schematic view of a system for dynamically controlling illumination of a scene, according to another illustrative embodiment.

For example, FIG. 1B illustrates another embodiment of the system 100B having multiple light sources. System 100B includes a first light source 108a and a second light source 108b. In some embodiments, the first and second light sources 108a, 108b can be selected to have different wavelengths of light. For example, the first light source can be a near IR light source while the second light source can be a visible light source (e.g., a RGB laser, a white-light laser), or vice versa. As illustrated, in FIG. 1B, the first light source 108a and the second light source 108b can each generate a light. The first light and the second light can be combined via an optical combiner 117 to create a combined light 116. The imaging unit 122 of system 100B is also depicted as having camera 122a and image processor 122b. In other embodiments, the camera and image processor can be a single component.

The combined light 116 can travel along the optical path 114 to an optical element (e.g. a beam splitter, lens, etc.). As described previously in association with system 100A, an optical element can be placed in optical path 114 to create a common aperture 110 for the light sources 108a and 108b and the imaging unit. Any of the previously described optical elements can be used.

Figure 2:
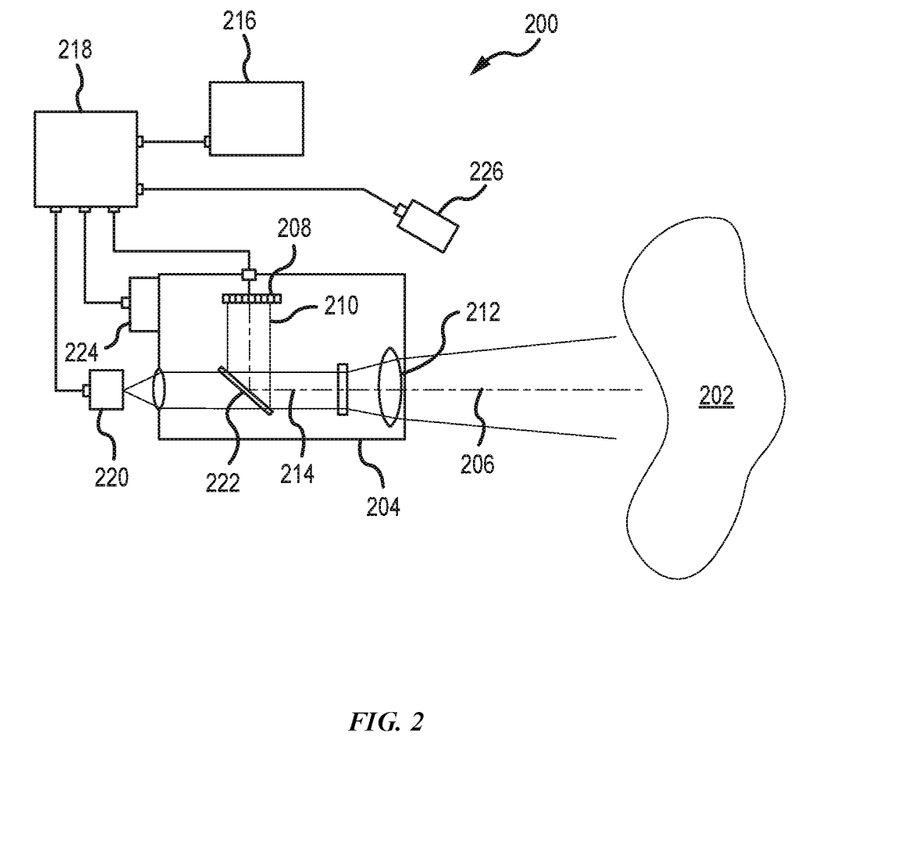
FIG. 2 is schematic view of a system for dynamically controlling illumination of a scene, according to an additional illustrative embodiment.

In some embodiments, such as that illustrated in FIG. 2, the system can include a second inertial-sensing unit coupled to the illumination unit 104 and in communication with the control unit 120 (see 224 in FIG. 2). This may be beneficial for vehicles that have headlights disposed on flexible mounts. In such instances, the headlight may bounce around itself independent or only partially related to the movement of the vehicle. In such cases, a second inertial-sensing unit 224 coupled to the illumination unit 104 can be further assistance in optically stabilizing the light.

In general, the second inertial-sensing unit 216 is operable to generate signals representing a position of the illumination unit 204, an orientation of the illumination unit, a change in position of the illumination unit, a change in orientation of the illumination unit, or any combination thereof. These signals are transmitted to the control unit 218. The second inertia-sensing unit may include capacitive sensors and optical proximity sensors for measuring translations and rotations of the imaging unit (such as imaging unit 122 of FIG. 1B) and/or illumination unit 204 relative to the vehicle. Such measurements may incorporate a reference position, a reference orientation, or both, relative to the vehicle. In these embodiments, the control unit 218 can receive signals from the second inertial-sensing unit and use such signals in combination with the signals from a first inertial-sensing unit 118 to generate control signals. By combining signals from the first inertial-sensing unit 118 and the second inertial-sensing unit 216, the control unit 120 may account for offsets experienced by the illumination unit 204 as well as offsets experience by the vehicle, thereby improving accuracy in position and orientation of the axis of projection 206.

In some embodiments, the system can include a light-sensing unit 226 in communication with the control unit 218. The light-sensing unit is operable to compile a light-intensity profile (e.g., scene contrast) of the scene 202 and generate signals representing the light-intensity profile. These signals are transmitted to the control unit 218. The light-sensing unit may include devices (or an array of such devices) selected from a group consisting of a photoemissive cell, a photoconductive cell, a photodiode, and a phototransistor. Other cells or devices are possible. In these embodiments, the control unit 218 can receive signals from the light-sensing unit and use such signals in combination with the signals from any inertial-sensing units 216 to generate control signals.

Returning to FIGS. 1B and 1n some embodiments, the system can include a proximity-sensing unit (not depicted in the figures) coupled to the vehicle. The proximity-sensing unit is in communication with the control unit 120 and operable to generate signals representing a distance of the vehicle relative to a reference in the scene 102. These signals are transmitted to the control unit 120. The measurement of multiple distances is possible, thus allowing multiple references to be monitored. Such monitoring may be advantageous in determining surface contours of objects in the scene 102 (e.g., a slope in a road). The proximity-sensing unit may incorporate sensors based on light detection or ranging (LIDAR) or ultrasound. However, other sensors are possible. In these embodiments, the control unit 120 can receive signals from the proximity-sensing unit and use such signals in combination with the signals from the first inertial-sensing unit 118 to generate control signals.

In some embodiments, the system 100 includes a global positioning system (GPS) receiver module (not depicted in the figures) in communication with the control unit 120. The GPS receiver module is operable to generate signals representing a position of the vehicle and transmit such signals to the control unit 120. The position of the vehicle may enable the control unit 120 to identify the characteristic of the scene 102, including anticipating the characteristics based on a motion of the vehicle. For example, the GPS receiver module can determine a location of the vehicle and, in conjunction with the control unit 120, determine if there are upcoming changes, such as an elevation change or a curve in the road ahead of the vehicle and use the information to predictively control the illumination of the upcoming scene. To predictively control the illumination of the scene, the control unit can send signals to the illumination unit 108a, 108b and/or spatial light modulator 112 to alter an orientation of the axis of projection, the illumination pattern of the light, or a combination thereof in anticipation of the upcoming scene.

In operation, the inertia-sensing unit 118 provides signals to the control unit 120 that include feedback on a position of the vehicle, an orientation of the vehicle, a change in position of the vehicle, a change in orientation of the vehicle, or any combination thereof. Based on this information, the control unit 120 adjusts the orientation of projection of light along the axis of projection 106 and/or the illumination pattern for the light 116. This adjustment may involve the control unit 120 sending signals to direct the spatial light modulator 112 to manipulate spatial properties of the light 116, to direct the light source 108 to change the light 116, or both. Moreover, the control unit 120 may direct mechanical actuators to displace optical elements within the illumination unit 104 (e.g., proximate to the aperture 110) or to displace the illumination unit 104 itself. Such direction may correspond to a change in the illumination profile experienced by the scene 102, including a change in boundaries of the illumination profile. In general, the control unit 120 dynamically adjusts the orientation of the projected light and/or the illumination pattern of the light in real time. Further, such adjustment may occur faster than suspension errors can be corrected by mechanical vibration compensations systems, as feedback is received from the inertial-sensing unit 118 and the redirection of the projected light is accomplished through changes in the spatial-light modulator and/or light source configuration.

When mounted to the vehicle, the system 100 is able to stabilize the light projected from the vehicle in response to motion of the vehicle (e.g., caused by bumps in a road). For example, as a vehicle travels along a road, it can experience bumps, potholes, and the like. As a result of the bumps, potholes, or the like, the vehicle moves vertically (and in some cases, horizontally) which is detected by the inertia sensing unit 118. The inertia sensing unit 118 detects the axis position and/or orientation changes the vehicle experiences and relays this information regarding the vehicle's axis position and/or orientation changes to the control unit 120. In response, the control unit 120 sends control signals to the illumination unit and/or the spatial light modulator so the light can be altered and steered to a nominal position and orientation defined by the vehicle being in a level plane relative to the road surface.

It will be appreciated that, in some embodiments, boundaries of the illumination profile may be regulated by the light source 108, the spatial light modulator 112, or both. Such regulation may mitigate a need for mechanical actuation (i.e., of optical elements or the illumination unit 104). For example, and without limitation, if the light source 108 includes the LED array, individual LEDs could be deactivated (or reactivated) to define extents for the illumination pattern. These extents would propagate through the optical path 114, along the axis of projection 106, and onto the scene 102. Upon interacting with the scene 102, the extents would correspond to boundaries of the illumination profile. In another non-limiting example, the spatial light modulator 112 could operate with a spatial buffer of zero intensity (or near zero intensity) around its perimeter. The spatial buffer, or portions thereof, could be activated (or deactivated) to allow light passage along the optical path 114 for certain portions of the spatial light modulator. Thus, extents for the illumination pattern could be established that propagate through to the illumination profile, thereby forming boundaries.

In these embodiments, the control unit 120 enables the boundaries of the illumination profile to be shifted dynamically in response to signals received from the inertial-sensing unit 118. For example, the inertial-sensing unit 118 can detect changes in the vehicle's axis position and/or orientation that are indicative of a curve in a road and relay this to the control unit 120, which causes the boundaries of the illumination profile to shift to maintain the nominal position and orientation of the light with respect to the curve in the road. In other words, through control of the light source 108 and/or the spatial light modulator 112, the projected light may be controlled or oriented to anticipate the curve in the road and project light along the road path. In another example, the control unit 120 may detect the vehicle is going over a bump and control the projected light downward to avoid flashing light at a viewer of the vehicle. It is an advantage of the system 100 that illumination of the scene 102 may be controlled dynamically through optical manipulations such as pixel-space manipulations rather than mechanical controlling of the headlight. However, in some embodiments, the system 100 is supplemented by mechanical actuation of optical elements, the illumination unit 104, or combinations thereof.

Further, during operation of some embodiments, the imaging unit 122 captures images of the scene 102, including light that interacts with the scene 102 from the illumination unit 104. Imaging unit 122 converts the captured images into data signals that can be processed by the control unit 120. The control unit 120 utilizes software algorithms to analyze and identify characteristics of the scene 102 that merit altering the axis of projection 106, the illumination pattern, or both. For example, and without limitation, the control unit 120 may identify an upcoming curve that merits horizontal steering of the light 116 as the vehicle moves on a road. In another non-limiting example, the control unit 120 may identify a highly-reflective object (e.g., a sign) that creates a "hot spot" in the scene 102. The control unit 120 then controls the spatial light modulator 112 to decrease the illumination projected onto the highly-reflective object via the light 116. The spatial light modulator 112, in concert with the control unit 120, thus acts to alter a distribution of light intensity within the illumination pattern. For example, the control of the spatial light modulator 112 instructs the modulator to rotate a portion of the array of reflective surfaces of the modulator. By rotating a portion of the reflective surfaces, part of the projected image is correspondingly turned off or dimmed. Through the control of the reflective surfaces of the spatial light modulator 112, the image or light projected by the illumination unit 104 is controlled. Such alteration enables the system 100 to provide contrast control for the scene 102. In some embodiments, the system 100 may utilize the luminosity-sensing unit to measure the light intensity profile, or map, of the scene 102. In these embodiments, the luminosity-sensing unit may serve in place of or in addition to the imaging unit 122.

Now referring primarily to FIG. 2, a schematic view is presented of a system 200 for dynamically controlling illumination of a scene 202, according to an additional illustrative embodiment. The system 200 of FIG. 2 lacks the spatial light modulator 112 found in the system 100 of FIGS. 1A-1B. The scene 202 may be an environment outside of a vehicle and contain objects such as roads, sidewalks, intersections, crosswalks, signs, light-posts, overhanging lights, other vehicles, individuals, animals, trees, and flora. Other objects are possible. The system 200 includes illumination unit 204 having an axis of projection 206. The illumination unit 204 is coupled to a vehicle and operable to project light onto the scene 202 along the axis of projection 206. For purposes of clarity, the vehicle is not shown in FIG. 2.

The illumination unit 204 includes an array of light sources 208 for generating a light 210. The array of light sources 208 includes individual members having a selectable emission intensity of light. In some embodiments, the individual members have a broadband emission of electromagnetic radiation (e.g., an emission of white light). In other embodiments, the individual members include sub-groups dedicated to narrow wavelength bands such as red wavelength bands, green wavelength bands, and blue wavelength bands (i.e., RGB). These sub-groups are arranged within the array of light sources 208 such that white light is produced overall. However, the sub-groups may be individually activated to produce light corresponding solely to an individual wavelength band (e.g., red) or a combination of wavelength bands (e.g., yellow produced by red and green). It will be appreciated that other numbers and types of wavelength bands are possible for the individual members, including non-visible wavelength bands such as infrared wavelength bands.

The illumination unit 204 also includes an aperture 212, which can face the scene 202. The aperture 212 may be a simple gap in the illumination unit 204, or contain other optional optical elements to assist in directing light along the axis of projection 206. Non-limiting examples of optical elements include shutters, lenses, prisms, mirrors, filters, collimators, light pipes, beam splitters, and diffraction gratings. Other optical elements, however, are possible. In FIG. 2, the aperture 212 is depicted as including a lens. However, this depiction is for purposes of illustration only. Those skilled in the art will recognize that other optical elements, and their corresponding combinations, are possible yet remain within the scope of the present disclosure.

In some embodiments, the aperture 212 includes a displaceable optical element selected from the group consisting of a lens, a mirror, and a prism. In such embodiments, a motion of the displaceable element includes a vertical shift, a horizontal shift, a tilt (i.e., rotation about a horizontal axis), a swing (i.e., rotation about a vertical axis), or combinations thereof. For example, and without limitation, the aperture could include a shift lens, a tilt/tip mirror, and a rotatable prism. Other displaceable elements are possible. The displaceable optical element is operable to assist in changing a direction, or orientation, of the axis of projection.

The system 200 also includes a first inertia-sensing unit 216 coupled to the vehicle. The first inertial-sensing unit 216 generates signals representing a position of the vehicle, an orientation of the vehicle, a change in position of the vehicle, a change in orientation of the vehicle, or any combination thereof. The first inertia-sensing unit 216 may include accelerometers and/or gyroscopes for sensing, respectively, translations and rotations of the vehicle as it travels. For example, and without limitation, the first inertia sensing unit 216 may include three accelerometers and three gyroscopes for determining, respectively, translations and rotations of the vehicle in three dimensional space to determine information regarding the position and orientation of the vehicle relative to the road surface. Other sensor types and combinations, however, are possible.

The system 200 additionally includes a control unit 218 in communication with the illumination unit 204 and the first inertial-sensing unit 216. The control unit 218 can receive signals from the first inertial-sensing unit 216, and in response, send control signals to the illumination unit 204 to adjust the orientation for the axis of projection 206, an illumination pattern of the light 210, or combinations thereof. The control unit 218 is operable to change the illumination profile projected onto the scene 202 in cooperation with the array of light sources 208, and in certain embodiments, the aperture 212. Such change occurs dynamically and in real-time based on feedback regarding the position and/or orientation of the vehicle relative to the road surface, from at least the first inertia-sensing unit 216. If the aperture 212 includes the displaceable optical element, the control unit 218 may be in communication with a transducer (e.g., a motor) that enables actuation of the displaceable optical element. In other words, the displaceable optical element can move in position and/or orientation, which can cause a change in position and/or orientation of the projected light 210.

In some embodiments, such as that shown in FIG. 2, the system 200 includes imaging unit 220 in communication with the control unit 218. The imaging unit 220 can capture images of the scene 202, which can include interaction of the illumination profile with the scene 202. In FIG. 2, the imaging unit 220 shares a common aperture (i.e., 212) with the illumination unit 204. This configuration is aided by a beam splitter 222 that directs a portion of light received through the aperture 212 from the scene 202 towards the imaging unit 220. However, other configurations of the imaging unit 220 are possible. For example, and without limitation, the imaging unit 220 may be a unit external to the illumination unit 204. Although FIG. 2 depicts the imaging unit 220 as being a single unit, this depiction is not intended as limiting. Other numbers and configurations of the imaging unit 220 are within the scope of the present disclosure.

The imaging unit 220 generates data signals representing the images of the scene 202 and sends such data signals to the control unit 218. Thus, the imaging unit 220 effectively transmits the images to the control unit 218. In embodiments having the imaging unit 220, the control unit 218 can further receive data signals from the imaging unit 220 and use such data signals in combination with signals from the first inertial-sensing unit 216 to generate control signals. In these embodiments, the control unit 218 may include processors and memories to process software algorithms that analyze the images captured by the imaging unit 220. Such software algorithms may identify characteristics of the scene 202 that merit altering the axis of projection 206 or the illumination pattern. Non-limiting examples of the characteristics include curves in a road, upcoming crests in a hill, animals entering a field of view, and highly-reflective objects. Other characteristics are possible. For example, the imaging unit 220 can generate data signals that may be indicative of a crest in a hill in the ahead of the road. The imaging unit 220 transmits these data signals to the control unit 218, which can analyze the image to determine if the axis of projection 206 or the illumination pattern requires adjustment to maintain a nominal position and/or orientation of the projected light 210 relative to the road surface due to the crest in the hill. If adjustment in needed, the imaging unit 220 sends signals to the illumination unit 204 and/or the spatial light modulator to so the projected light 210 can be altered and steered to a nominal position and orientation defined by the vehicle being in a level plane relative to the road surface (e.g., the crest in the hill).

In some embodiments, the system 200 includes a second inertial-sensing unit 224 coupled to the illumination unit 204 and in communication with the control unit 218. The second inertial-sensing unit 224 is operable to generate signals representing a position of the illumination unit 204, an orientation of the illumination unit 204, a change in position of the illumination unit 204, a change in orientation of the illumination unit 204, or any combination thereof. These signals are transmitted to the control unit 218. The second inertia-sensing unit 224 may include capacitive sensors and optical proximity sensors for measuring translations and rotations of the illumination unit 204 relative to the vehicle. Such measurements may incorporate a reference position, a reference orientation, or both, relative to the vehicle. In these embodiments, the control unit 218 can receive signals from the second inertial-sensing unit 224 and use such signals in combination with the signals from the first inertial-sensing unit 216 to generate control signals. By combining signals from the first inertial-sensing unit 216 and the second inertial-sensing unit 224, the control unit 218 may account for offsets experienced by the illumination unit 204, thereby improving accuracy in position and orientation of the axis of projection 206.

In some embodiments, the system 200 includes a light-sensing unit 226 in communication with the control unit 218. The light-sensing unit 226 is operable to compile a light-intensity profile, or map, of the scene 202 (e.g., scene contrast) and generate signals representing the light-intensity profile, or map. These signals are transmitted to the control unit 218. The light-sensing unit 226 may include devices (or an array of such devices) selected from a group consisting of a photoemissive cell, a photoconductive cell, a photovoltaic cell, a photodiode, and a phototransistor. Other cells or devices are possible. In these embodiments, the control unit 226 can receive signals from the light-sensing unit 226 and use such signals in combination with the signals from the first inertial-sensing unit 216 to generate control signals.

In operation, the system 200 of FIG. 2 functions analogously to the system of FIGS. 1A-1B. However, due to an absence of the spatial light modulator (see 112 in FIG. 1A), the system 200 of FIG. 2 relies on the array of light sources 208 to optically manipulate the illumination pattern of the light 210. Such optical manipulation may also adjust the orientation of the axis of projection 206. More specifically, the array of light sources 208 can alter extents of the illumination pattern, alter a distribution of light intensity within the illumination pattern, alter a spectral distribution of light within the illumination pattern, or combinations thereof. These alterations propagate through the optical path 214, along the axis of projection 206, and onto the scene 202, thereby changing the illumination profile that is perceived by a driver, passenger, etc.

For example, and without limitation, individual members of the array of light sources 208 could be assigned by the control unit 218 to a spatial buffer and activated (or deactivated) to define extents of the illumination pattern. In another non-limiting example, the control unit 218 could direct individual members of the array of light sources 208 to selectively alter their illumination intensities, thereby altering the distribution of light intensity within the illumination pattern. Illumination intensity is a result of the luminous power (i.e., the wavelength-weighted power emitted from the light source in a particular direction). To change the illumination intensity, the control unit can direct individual members of the array of the light sources 208 to change the amount of power emitted. In yet another non-limiting example, the control unit 218 could direct individual members, each associated with a sub-group dedicated to a narrow wavelength band, to selectively activate (or deactivate). This selective activation (or deactivation) could also involve changing illumination intensities (e.g., to form a gradient). Thus, the illumination pattern would experience an alteration in spectral distribution.

In general, the array of light sources 208 operates cooperatively with the control unit 218 to dynamically adjust the orientation of the axis of projection 206, adjust the illumination pattern of the light 210, or combinations thereof. This dynamic adjustment occurs in real time and in response to feedback from the first inertial-sensing unit 216, the imaging unit 220, the second inertial-sensing unit 224, and the light-intensity unit 226. In some embodiments, however, the system 200 is supplemented by mechanical actuation of optical elements (e.g., the displaceable optical elements), the illumination unit 204, or both. Further, in some embodiments, the control of the array of light sources 208 may be controlled in conjunction with a spatial light modulator.

According to an illustrative embodiment, a method for dynamically controlling illumination of a scene includes projecting the illumination pattern onto the scene using a light generated by illumination unit. The illumination unit is coupled to the vehicle and has an axis of projection. The method can also include measuring vehicle parameters selected from the group consisting of a position of the vehicle, an orientation of the vehicle, a change in position of the vehicle, and a change in orientation of the vehicle. The method involves altering an orientation of the axis of projection, the illumination pattern of the light, or a combination thereof, based on the measured vehicle parameters.

In some embodiments, the orientation of the axis of projection is altered by displacing the illumination unit. In some embodiments, the orientation of the axis of projection is altered by displacing an optical element associated with the illumination unit. In these embodiments, the optical element selected from the group consisting of a lens, a mirror, and a prism. In some embodiments, the illumination pattern is altered using a spatial light modulator that interacts with the light. The spatial light modulator may be a digital micromirror device (DMD) or a liquid crystal on silicon (LCoS) device. In some embodiments, the illumination pattern is altered by selecting an illumination intensity of individual light sources in an array of light sources.

In some embodiments, the method further includes capturing images of the scene using an imaging unit (e.g. a camera) and identifying reference features in the scene using the images. Non-limiting examples of reference features include road markings, curbs, signs, light-posts, pedestrians, vehicles, animals, and flora. Other reference features are possible. In such embodiments, the method also includes analyzing the images to determine changes to the reference features.

In some embodiments, the method further includes measuring illumination unit parameters selected from the group consisting of a position of the illumination unit, an orientation of the illumination unit, a change in position of the illumination unit, and a change in orientation of the illumination unit. In some embodiments, the method further includes measuring a distance of the vehicle relative to a reference in the scene. In some embodiments, the method further includes measuring a light-intensity profile of the scene.

Figure 3:
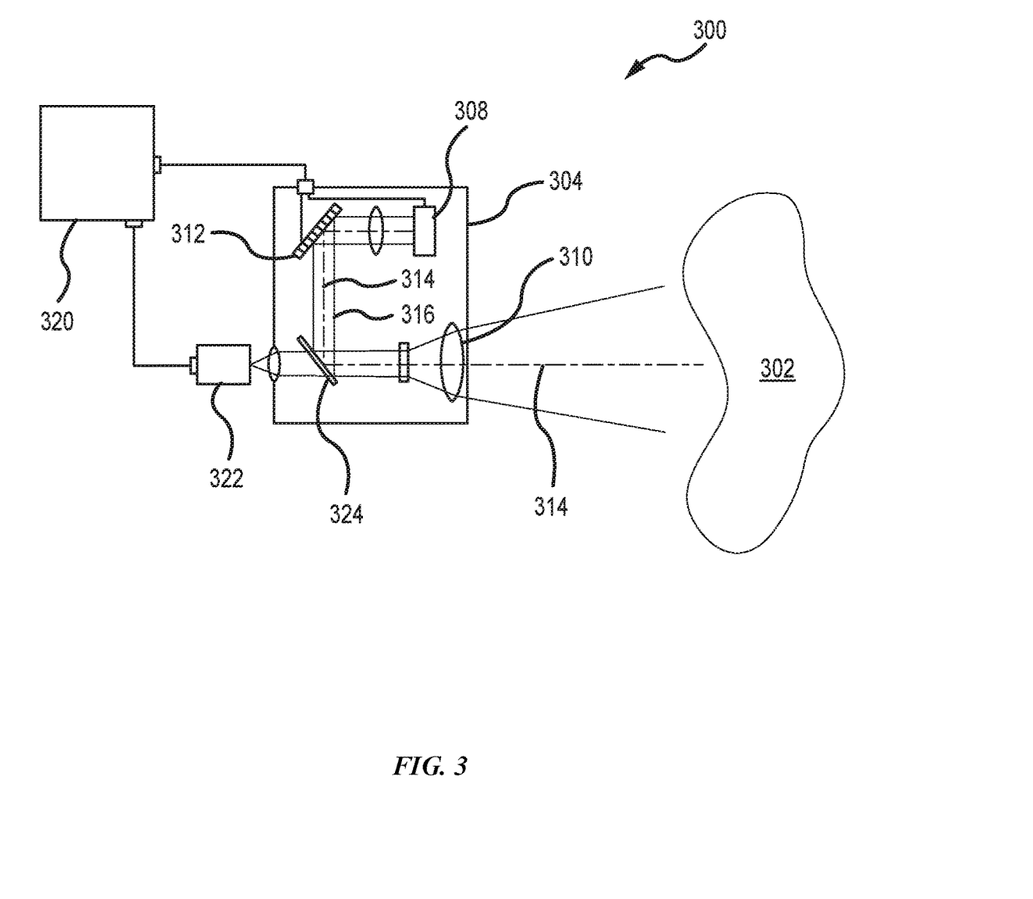
FIG. 3 shows a schematic view of an adaptive lighting system for dynamically controlling illumination of a scene, according to an illustrative embodiment.

Now referring to FIG. 3, a schematic view is presented of an adaptive lighting system 300 for dynamically controlling illumination of a scene 302, according to an illustrative embodiment. The adaptive lighting system 300 of FIG. 3 lacks the inertia sensing unit found in the systems of FIGS. 1A-2. As described previously, the scene 302 may be an environment outside of a vehicle and contain objects such as roads, sidewalks, intersections, crosswalks, signs, light posts, overhanging lights, other vehicles, pedestrians, animals, trees, and flora. Other objects are possible.

The adaptive lighting system 300 includes an illumination unit 304. The illumination unit 104 projects light onto the scene 302. In operation of the lighting system, a light 316 is generated from a light source 308 of the illumination unit 104 and travels along an optical path 314 to a reflective spatial light modulator 312 that is an LCoS (liquid crystal on silicon) to a beam splitter 324 and projected out an aperture 310 onto the scene 302.

The illumination unit 304 includes the light source 308 and an aperture 310. The light source 308 may be a single source providing coherent light. In some embodiments, the light source 308 can provide a polarized coherent light. The light source can be a white laser or other suitable coherent light source.

In other embodiments, the light source 308 can be a collection of multiple sources and may have individual elements dedicated to a specific wavelength band. In such embodiments, each of the multiple light sources can be time synced with a single spatial light modulator (i.e., LCoS) to project a light onto the scene 302. In other embodiments, each light source can be associated with an individual spatial light modulator (i.e., LCoS) and a beam splitter (e.g., dichroic) in the optical pathway to combine the individual beams of light to create a light to project onto the scene. This configuration can allow for control over the phase manipulation of the light beam(s). Other configurations for the collection of multiple sources are possible.

Like in the prior described systems, the aperture 110 of the adaptive lighting system 300 may be a simple gap in the illumination unit 304, or contain one or more optical elements to assist in directing light along the optical path 314. Non-limiting examples of optical elements include shutters, lenses, prisms, mirrors, filters, collimators, light pipes, beam splitters, and diffraction gratings. Other optical elements, however, are possible. In FIG. 3, the aperture 310 is depicted as including a lens. However, this depiction is for purposes of illustration only. Those skilled in the art will recognize that other optical elements, and their corresponding combinations, are possible yet remain within the scope of the present disclosure.

The illumination unit 304 includes a liquid crystal on silicon (LCoS) device 312 as a spatial light modulator to control the projected light distribution. The LCoS device can be a phase-only spatial light modulator.

In some embodiments, the system 300 includes an imaging unit 322 in communication with the control unit 320. The imaging unit 322 is configured to capture images of the scene 102, which includes interaction of the illumination profile with the scene 302. In FIG. 3, the imaging unit 322 shares a common aperture (i.e., 310) with the illumination unit 304. This configuration is aided by a beam splitter 324 that directs a portion of light that is reflected from the scene 302 and received through the aperture 310 towards the imaging unit 322. However, other configurations of the imaging unit 322 are possible. In alternative embodiments, the imaging unit 322 and the illumination unit 104 can have separate apertures. Although FIG. 3 depicts the imaging unit 322 as being a single unit, this depiction is not intended as limiting. Any other number and configurations of the imaging unit 322 are within the scope of the present disclosure.

The imaging unit 322 can be a high-speed camera, in some embodiments. The imaging unit can also be a near IR (infra-red) camera. In some embodiments, multiple imaging units can be used and selected based on wavelength.

The imaging unit 322 generates data signals representing imaging images of the scene 302 and sends such data signals to the control unit 320. Thus, the imaging unit 322 effectively transmits the images to the control unit 320. In embodiments having the imaging unit 322, the control unit 320 is further configured to receive data signals from the imaging unit 322 and use such data signals to control the light distribution in combination with the LCoS. For example, a camera can view a scene as the light is projected onto it. This allows for forming a scene dependent light distribution in real time. The camera can send data signals to the control unit 120, which can also control the LCoS to modify the light distribution. In these embodiments, the control unit 120 may include a processor and/or a memory to process software algorithms that analyze the images captured by the imaging unit 322.

Similarly, the control unit 320 may be in communication with the liquid crystal on silicon (LCoS) device. Using phase-only LCoS spatial light modulators to control the projected light distribution offers a number of advantages over adaptive lighting systems using steerable beams, matrix LED and DLP technologies. Adaptive lighting systems using an LCoS as a spatial light modulator can have larger depth of focus and larger configurable fields of illumination. It can also allow for real-time field-dependent projected image magnification. Additionally, large aperture sizes can be possible to extend eye safety margins for total luminous flux output (for large physical size LCoS arrays). In some embodiments, eye safety can be improved because the LCoS can spatially modulate the light distribution to alter the projected light distribution so that light is dimmed or diverted from projecting into the eyes of oncoming drivers and/or pedestrians. For example, the LCoS can redistribute the light incident on it to control a projected light pattern, rather than using selective attenuation in a focal plane.

The use of an LCoS as a spatial modulator of the light distribution also can have the benefit of higher lumen projection capabilities (e.g., LCoS can handle radiant energy needed for a bright headlight). Also because the LCoS can be used with coherent light sources, the adaptive lighting systems can have a richer color gamut.

In some embodiments, an optional amplitude modulator can be used with the adaptive lighting system having an LCoS spatial modulator. The amplitude modulator can be placed in the pupil plane. In other embodiments, the optional amplitude modulator can be placed in an image plane.

In some embodiments, the adaptive lighting system having an LCoS spatial modulator can include optional speckle de-noising optics. For example, speckle can be reduced using different phase offsets (e.g., spatial dithering without altering the image). In some embodiments, speckle can be reduced using an optional reflective optic (e.g. mirror) that can be placed before or after the LCoS in the optical pathway. In other embodiments, dichroic beam splitters can provide a de-speckling effect. In still other embodiments, polarization modulators and/or diffusers can be used in the lighting system to reduce speckle In some embodiments, the systems, methods, devices, can modify the projection of light in response to information provided by one or more image sensors. The projection may be utilized to highlight particular areas within the field of illumination of the light. For example, a light source may be oriented or otherwise controlled to highlight a detected object in or near the path of travel of a vehicle. Such detected objects may include objects in the roadway in front of a vehicle, objects or beings off the road with the potential for entering the vehicle's path of travel, extreme conditions of the road, and the like. In another example, the light may be controlled to adjust the contrast across the field of illumination of a headlight. For example, a particular portion within the field of illumination of the headlight, such as a reflective traffic sign or reflective tape on a roadway, may be illuminated brighter than other portions within the field of illumination. In other embodiments, a particular portion within the field of illumination of the headlight, such as an oncoming vehicle, may be dimmed within the field of illumination to reduce glare. By controlling the contrast across the field of illumination, portions of the field of illumination may be highlighted or have more light projected onto them than other portions in the field of illumination. The portions of the field of illumination with a higher contrast or with more light projected onto them may be determined.

Figure 4:
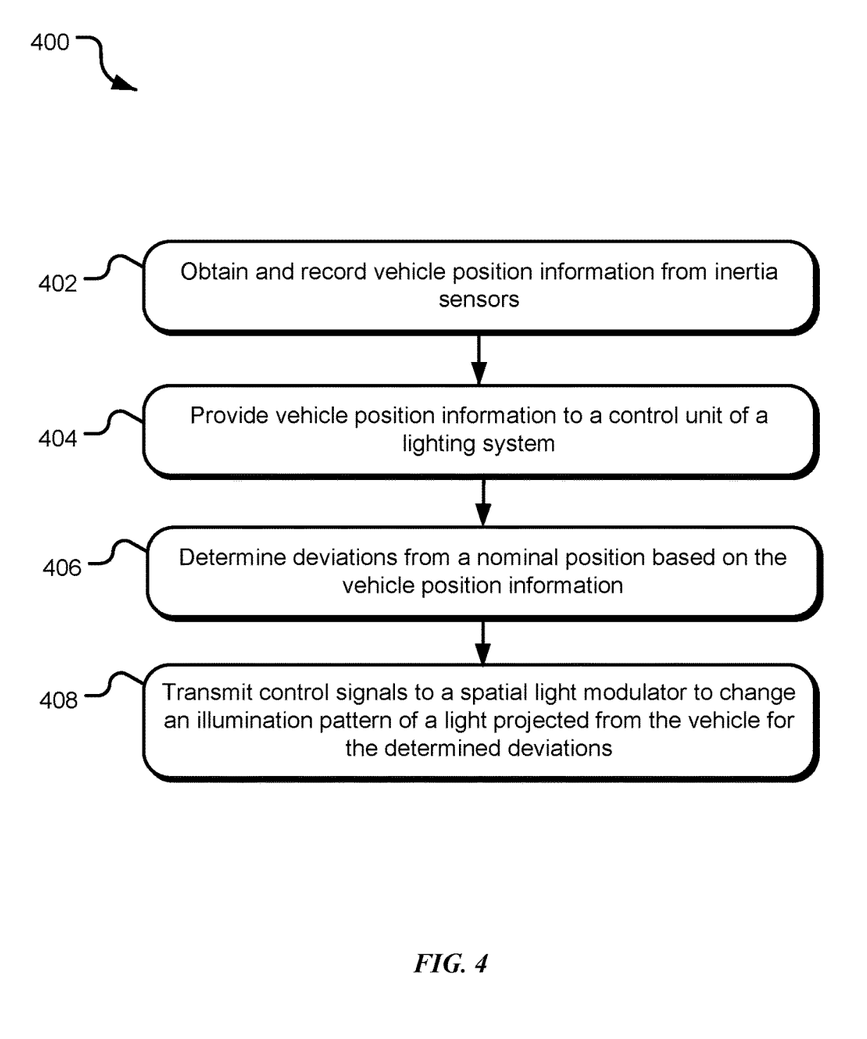
FIG. 4 is a flowchart of a method for optically stabilizing a light projected from a vehicle based on information received from one or more inertial sensors utilizing a dynamically controlled illumination system.

FIG. 4 shows a flowchart of a method for adjusting a light system of a vehicle based on information received from one or more inertia sensors. The operations may be performed by a headlight control system to increase the environmental awareness of the driver of a vehicle and/or improve the driving experience of the vehicle. In operation 402, the inertia-sensing unit can obtain detect and record information regarding the position and/or orientation of the vehicle. For example, as a vehicle travels along a road and encounters a bump, pothole, or the like, the vehicle moves as the suspension system does not entirely isolate the tire movement. An accelerometer or gyroscopic sensor can detect and record movement in the x-axis position, the y-axis position, the z-axis position, and orientation of the vehicle relative to the road that are caused by the tire movement. The information regarding the position and/or orientation of the vehicle obtained by the inertia-sensing unit can be provided to and received by the control unit of the system in operation 404.

Based on the received information regarding the position and/or orientation of the vehicle, the control unit can determine deviations from the nominal position of the vehicle relative to the road in operation 406. For example, the inertia-sensing unit can send information regarding the position of the vehicle in a y-axis (i.e., vertical direction) as a result of a bump in the road. The control unit can compare the received information about the y-axis position of the vehicle with a reference y-axis position value for the nominal position of the vehicle and determine deviations of the vehicle from the nominal position. While in another example, the inertia-sensing unit can send information regarding the position of the vehicle in an x-axis (i.e., lateral direction) as a vehicle steers into a turn. The inertia-sensing unit can also send information regarding the position of the vehicle in a z-axis (i.e., longitudinal direction).

In accordance with the determined deviations from the nominal position, the control transmits control signals to the spatial light modulator to adjust an illumination pattern of the light to maintain the nominal value of the light relative to the road in operation 408. For example, in some embodiments where the spatial light modulator is a DMD consisting of an array of micromirrors, the control unit can transmit signals to turn off select individual micromirrors within the array to change the illumination pattern of the light. For example, when a vehicle is traveling along a road and hits a crest in a hill, an increase in the y-axis position from the nominal y-axis position value may be detected. The control unit can then transmit signals to the DMD to turn off individual micromirrors in an upper portion of the array to change a vertical boundary of the illumination pattern of the light that is projected through the aperture of the system to optically adjust the light to the nominal value relative to the road. In another example, when there are deviations in the x-axis position from the nominal x-axis position, the control unit can transmit control signals to turn on/off individual micromirror in a left portion and/or right portion of the array to change a lateral boundary of the illumination pattern that is projected.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:
1. A system for dynamically controlling illumination of a scene, the system comprising:
an illumination unit coupled to a vehicle, the illumination unit comprising:
a light source positioned within a housing, and
a spatial light modulator disposed along an optical path extending from the light source to an aperture, wherein the spatial light modulator creates an illumination pattern for light projected from the light source through the aperture along an axis of projection,
an inertial-sensing unit coupled to the vehicle generating signals representing a measured inertial change of the vehicle in any direction; and
a control unit in communication with the illumination unit and the inertial-sensing unit, the control unit receiving the signals from the inertial-sensing unit and controlling the spatial light modulator based on the received signals from the inertial-sensing unit, wherein controlling the spatial light modulator comprises altering an operational state of the spatial light modulator to adjust an orientation of projection of the light along the axis of projection, the illumination pattern for the light, or combinations thereof.

2. The system of claim 1, further comprising:
an imaging unit for capturing images of the scene oriented along the axis of projection of the projected light, the imaging unit transmitting the captured images to the control unit and wherein the control unit further controls the spatial light modulator based on the transmitted images.

3. The system of claim 2, wherein the imaging unit shares a common aperture with the illumination unit.

4. The system of claim 1, wherein the control unit is further configured to control a state of the light source based on the received signals from the inertial-sensing unit.

5. The system of claim 4 wherein the light sources comprises an array of light elements and controlling the state of the light source comprises activating a portion of the array of light elements.

6. The system of claim 1, further comprising:
a second inertial-sensing unit coupled to the illumination unit and in communication with the control unit, the second inertial-sensing unit generating signals representing a measured inertial change of the illumination unit in any direction and transmitting the signals to the control unit, wherein the control unit further controls the spatial light modulator based on the second inertial-sensing unit signals.

7. The system of claim 1, further comprising:
a proximity-sensing unit coupled to the vehicle and in communication with the control unit determining a relative distance from the vehicle to a reference in point in an illuminated scene and transmitting signals representing the distance to the control unit, wherein the control unit further controls the spatial light modulator based on the proximity-sensing unit signals.

8. The system of claim 1, further comprising:
a GPS receiver module in communication with the control unit determining an estimated geographical location of the vehicle, wherein the control unit further controls the spatial light modulator based on the proximity-sensing unit signals.

9. The system of claim 1, wherein the aperture comprises a displaceable optical element selected from the group consisting of a lens, a mirror, and a prism.

10. A system for dynamically controlling illumination of a scene, the system comprising:
an illumination unit having an axis of projection and coupled to a vehicle, the illumination unit comprising:
an array of light sources for generating a light, the array of light sources comprising individual members for producing a selectable illumination intensity of light, and
an aperture, where the light generated by the array of light sources exits the aperture along the axis of projection;
a inertial-sensing unit coupled to the vehicle for generating signals representing a position of the vehicle, an orientation of the vehicle, a change in position of the vehicle, a change in orientation of the vehicle, or any combination thereof; and
a control unit in communication with the illumination unit and the inertial-sensing unit, the control unit controlling a state of the array of light sources of the illumination unit to adjust an orientation for the axis of projection, an illumination pattern for the light, or combinations thereof of the illumination unit based on the generated signals from the inertial-sensing unit.

11. The system of claim 10, further comprising:
an imaging unit for capturing images of the scene oriented along the axis of projection, the imaging unit transmitting the captured images to the control unit and wherein the control unit further controls the state of the array of light sources of the illumination unit based on the transmitted images.

12. The system of claim 10, wherein the illumination unit further comprises:
a spatial light modulator disposed along an optical path extending from the array of light sources to the aperture, wherein the spatial light modulator creates an illumination pattern for the projected light along the axis of projection.

13. The system of claim 12 wherein the control unit is further configured to control an operational state of the spatial light modulator based on the received signals from the inertial-sensing unit.

14. The system of claim 10 wherein the array of light sources comprises an array of light elements and controlling the state of the array of light source comprises activating a portion of the array of light elements.

15. A method for dynamically controlling illumination of a scene, the method comprising:
projecting an illumination pattern onto the scene using a light illumination unit, the light illumination unit coupled to a vehicle and having an axis of projection;
receiving a measured inertial change of the vehicle in any direction from an inertial-sensing unit coupled to the vehicle;
generating spatial light modulator control signals to alter an operational state of a spatial light modulator of the light illumination unit based on the received signals from the inertial-sensing unit; and
utilizing the spatial light modulator control signals to adjust an orientation of projection of the light along the axis of projection, the illumination pattern for the light, or combinations thereof.

16. The method of claim 15, wherein the orientation of the axis of projection is further adjusted by displacing an optical element associated with the illumination unit, the optical element selected from the group consisting of a lens, a mirror, and a prism.

17. The method of claim 15 wherein the inertial-sensing unit is an accelerometer.

18. The method of claim 15, further comprising:
capturing images of the scene using a camera sharing a common aperture with the illumination unit;
identifying a reference feature in the scene using the images;
analyzing the images to determine changes to the reference feature; and
generating further spatial light modulator control signals to alter the operational state of a spatial light modulator of the light illumination unit based on the analyzed images.

19. The method of claim 15, further comprising:
measuring an illumination unit parameter selected from the group consisting of a position of the illumination unit, an orientation of the illumination unit, a change in position of the illumination unit, and a change in orientation of the illumination unit.

20. The method of claim 12, further comprising:
receiving an estimated geographic location from a GPS receiver module in communication with the control unit; and
generating further spatial light modulator control signals to alter the operational state of the spatial light modulator of the light illumination unit based on the estimated geographic location.

* * * * *